United States Patent [19]

Gosdowski

[11] Patent Number: 5,000,653
[45] Date of Patent: Mar. 19, 1991

[54] SWINGING ARM ROBOT

[75] Inventor: Gerhard Gosdowski, Bietigheim-Bissingen, Fed. Rep. of Germany

[73] Assignee: Robert Bosch GmbH, Stuttgart, Fed. Rep. of Germany

[21] Appl. No.: 431,916

[22] Filed: Nov. 6, 1989

Related U.S. Application Data

[63] Continuation of Ser. No. 44,367, filed as PCT DE86/00269 on Jul. 1, 1986, abandoned.

[30] Foreign Application Priority Data

Aug. 10, 1985 [DE] Fed. Rep. of Germany ....... 3528769

[51] Int. Cl.$^5$ ............................................. B25J 18/00
[52] U.S. Cl. .................................. 414/744.5; 901/15; 901/23
[58] Field of Search ........................ 901/15, 23, 24, 25, 901/27; 414/744.5

[56] References Cited

U.S. PATENT DOCUMENTS 4,699,563 10/1987 Yokose ............................. 901/15 X

FOREIGN PATENT DOCUMENTS 3310107 10/1984 Fed. Rep. of Germany .

Primary Examiner—Robert J. Spar
Assistant Examiner—Donald W. Underwood
Attorney, Agent, or Firm—Michael J. Striker

[57] ABSTRACT

Swinging arm robot comprises at least two swinging arms and motor-operated articulated drives. Each motor of the drive is arranged on an articulated part of an articulated axle. At least one swinging arm is not provided with a motor. The motors of the two articulated axles, which are assigned to the one swinging arm, are each fastened at an adjacent articulated part.

3 Claims, 1 Drawing Sheet

SWINGING ARM ROBOT

This is a continuation of application Ser. No. 044,367, filed as PCT DE86/00269 on Jul. 11, 1986, now abandoned.

BACKGROUND OF THE INVENTION

The invention relates to a swinging arm robot. In a known swinging arm robot of this generic type, which comprises two swinging or swivel arms, which are connected one behind the other, and swivel axles or joints with electric motors, the motor for the first swivel axle connecting the base body with the first swivel arm is arranged at the base body, while the motor for the second swivel axle connecting the two swivel arms is fastened at the first swivel arm. In the present case the swivel axle designates the entire swivel joint, including the mechanical bearing members. A gripping device, or the like, and a motor intended to drive the latter, are fastened at the second swivel arm. In this arrangement, each swivel arm is provided with electrical structural component parts and installation devices, and the electrical power and control cables are divided into two harnesses, one of which leads from the base body to the first swivel arm, while the other leads from the first to the second swivel arm. This brings about a relatively high installation expenditure and, moreover, the mass is unfavorably distributed at the second swivel arm, since the gripping device, or the like, including its drive and the connection arrangement for the power supply, are arranged on one side of the second swivel arm with respect to the swivel axle.

SUMMARY OF THE INVENTION

It is an object of the present invention to provide an improved swinging arm robot.

According to the invention, its advantage resides on that electrical component parts and means for the connection and transmission of the drive power are dispensed with on at least one swinging arm, so that the expenditure for processing, assembly and installation is reduced.

In a swivel arm robot with only two swivel arms, it is suggested that the motor for the first swivel axle, which connects the base body with the first swivel arm, be arranged on the base body in a known manner, and the motor for the second swivel joint, which connects the first swivel arm with the second swinging arm, be arranged at the second swivel arm. By means of this it is achieved that the first swivel arm requires only mechanical bearing means and gear unit means, but no electrical drive and installation devices, and that the means for supplying drive power can be guided directly from the base body to the second swivel arm, which requires drive power for the gripping device, or the like, in any case.

A space-saving construction, in which all motors can be arranged on one side of the swivel arm, results when the second swivel arm overlaps the first swivel arm on the same side as a drive console of the base body, which drive console carries the first swivel joint. In this case, the first swivel arm can advantageously have the form of an extended body which is defined by at least approximately planar lateral surfaces, thereby facilitating its manufacture.

A favorable distribution of mass on the second swivel arm results when the second swivel arm consists of two arm parts which are located at least approximately diametrically opposite one another with respect to its swivel axle, one arm part carrying the gripping device, or the like, including its drive, while the other carries the connection arrangement for the power supply of the drives to the second swivel arm.

DESCRIPTION OF THE DRAWINGS

The single figure shows a simplified side view of a swivel arm robot which is provided with two swivel arms and with electrical drives at the swivel axles.

DETAILED DESCRIPTION OF THE PREFERRED EMBODIMENTS

Figure 1:
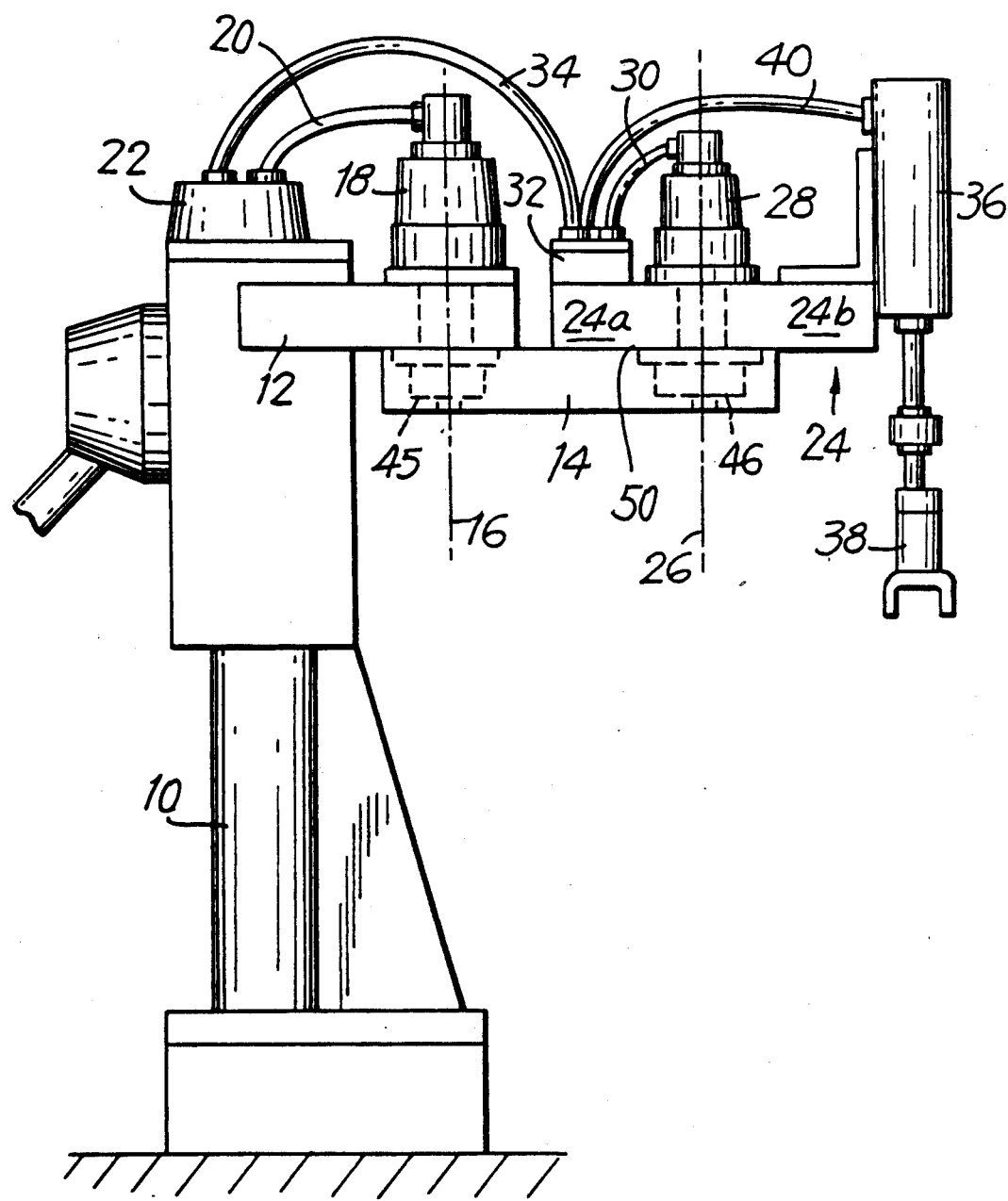

The swinging arm robot shown in the drawing has a base body 10, which is constructed as a stand and comprises a laterally projecting drive console 12 at which a first swivel arm 14 is supported as to be rotatable around a first swivel axle or joint 16, schematically shown in the drawing. An electric motor 18 is fastened on the drive console 12 so as to be coaxial relative to the swivel axle 16 and acts on the swivel arm 14 by means of a gear unit which is arranged in the interior of the swinging arm 14, preferably a harmonic drive gear unit 45, (schematically shown) and is able to rotate the swivel arm 14 relative to the base body 10. The motor 18 is connected with an electrical installation device 22 at the base body 10 by means of a cable harness 20.

A second swivel arm 24 is supported at the end of the first swivel arm 14 on the drive side so as to be rotatable around a second swivel axle or joint 26, also shown schematically in the drawing. A second electrical motor 28 is fastened at the second swivel arm 24 coaxially relative to the swivel axle 26 and is able to rotate the second swivel arm 24 around the swivel axle 26 relative to the first swivel arm 14 by means of a gear unit 46 which is arranged in the interior of the first swivel arm 14, preferably also a harmonic drive gear unit. The motor 28 is connected with an installation device 32 by means of a cable harness 30, the installation device 32 being connected in turn to the installation device 22 at the base body 10 by means of a cable harness 34.

The second swivel arm 24 consists of two arm parts 24a and 24b which are located diametrically opposite one another with respect to the swivel axle 26. The arm part 24a carries the electrical installation device 32, whereas an electrical drive 36 for a gripping device 38 is fastened at the other arm part 24b. The drive 36 can raise and lower the gripping device and open and close the gripping jaws. In case of need, a rotating drive can be provided for the gripping device 38 in a known manner, which rotating drive leads from the base body 10, via intermediate gear wheels, to the swivel axles or joints 16, 26. The drive 36 is connected with the electrical installation device 32 at the swivel arm 24 via a cable harness 40.

The second swivel arm 24 and the drive console 12 of the base body 10 both overlap the first swivel arm 14 on its upper side, thereby making it possible to arrange both motors 18 and 28 adjacent to one another at approximately the same height as in the prior art. Moreover, it is achieved by means of this arrangement that the two swivel arms 14, 24 can be constructed as substantially linearly extended bodies at the lateral surfaces 50, which are arranged so as to be perpendicular to the axes of swivel axles 16, 26, without steps so that the manufacturing is simplified and the expenditure on processing is reduced.

By means of the arrangement of the motors 18, 28 on the base body 10 and the second swivel arm 24 it is achieved that the first swivel arm 14 is completely free of the electrical drive and installation parts and only contains mechanical bearing and gear unit members. Accordingly, the assembly is simplified and the expenditure on installation is reduced. By means of the arrangement of the installation device 32 on the arm part 24a of the swivel arm 24, the center of mass of the swivel arm 24, including the parts which are fastened therein, is moved closer to the swivel axle 26 and the dynamics of the device are accordingly improved.

I claim:

1. In a swivel arm robot comprising a stationary base body and at least two swivel arms which are connected to each other and each having a swivel joint provided with a motor-driven drive, each swivel joint including one part fastened to a respective motor of a respective motor-driven drive, and another part including mechanical bearing means and gear unit means, the improvement comprising at least one of said swivel arms (14) containing only mechanical bearing means and gear unit means and having an indirect connection with the motors of said drives only by said gear unit means contained in said one of said swivel arms, said motors (18, 28) of said swivel joints (16, 26) being fastened to said stationary base body and another of said swivel arms (12, 24), respectively, whereby said one of said swivel arms is driven by mechanical structural components only, said another swivel arm (24) being formed of two arm parts (24a, 24b) which are located at least approximately diametrically opposite one another with respect to the swivel joint (26), one of said arm parts (24b) carrying a gripping device (38) including a drive (36) while another of said arm parts (24a) carries a connection arrangement (32) for a power supply of said drive (36).

2. Swinging arm robot, according to claim 1, characterized in that said another swivel arm (24) overlaps said at least one of said swivel arms (14) on the same side as a drive console (12) of said base body (10), which drive console (12) carries said motor (18) for said first articulated axle (16).

3. Swinging arm robot according to claim 2, characterized in that said at least one of said swivel arms (14) has the form of an extended body which is defined by at least approximately planar lateral surfaces which are not stepped.

* * * * *